Aug. 19, 1941.    O. M. HOCH ET AL    2,253,275
LAMINATED TUBE WINDING MACHINE
Filed July 31, 1940    5 Sheets-Sheet 1

INVENTOR.
OTTO M. HOCH
CARL J. STUDEMAN
BY
D. Clyde Jones

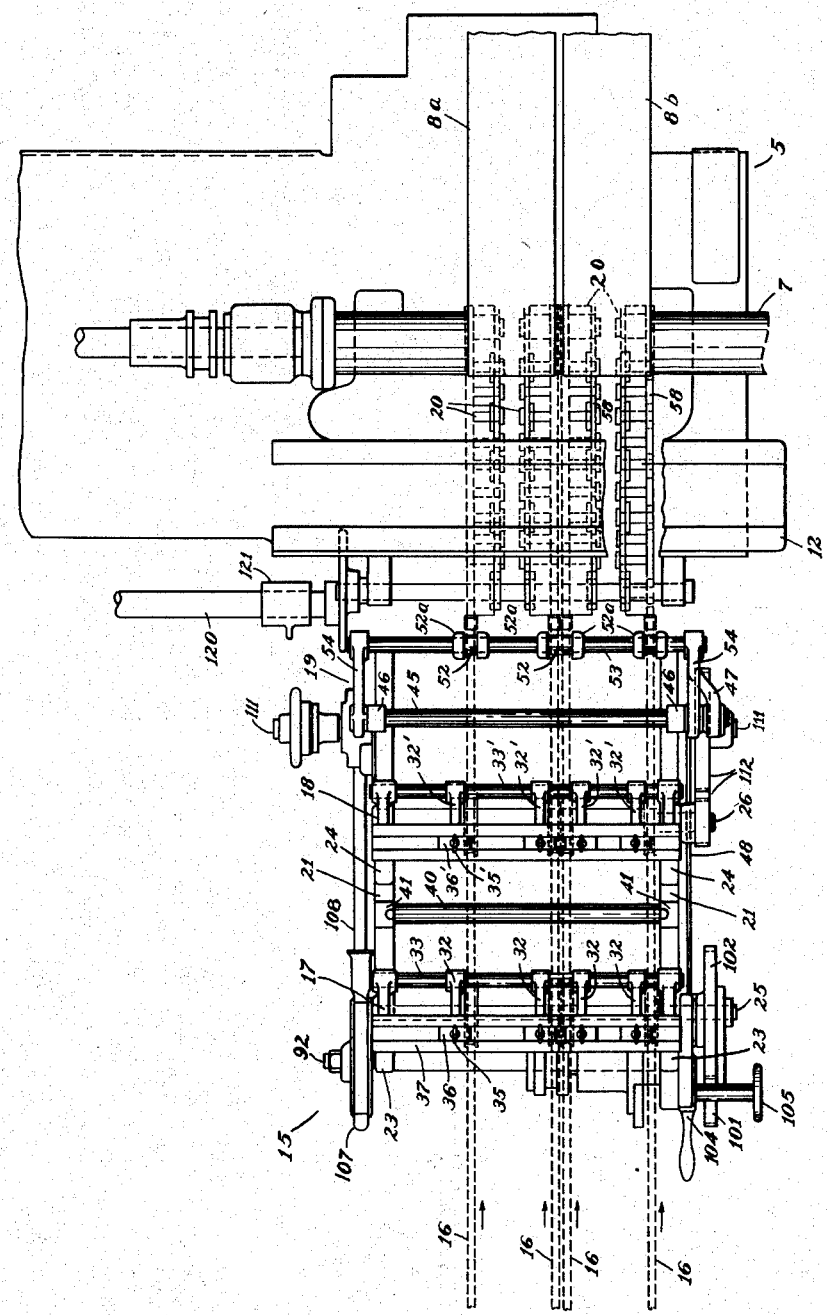

Aug. 19, 1941.  O. M. HOCH ET AL  2,253,275

LAMINATED TUBE WINDING MACHINE

Filed July 31, 1940  5 Sheets-Sheet 3

INVENTOR.
OTTO M. HOCH
CARL J. STUDEMAN
BY D. Clyde Jones
ATTORNEY.

Aug. 19, 1941.   O. M. HOCH ET AL   2,253,275
LAMINATED TUBE WINDING MACHINE
Filed July 31, 1940   5 Sheets-Sheet 4

INVENTOR.
OTTO M. HOCH
CARL J. STUDEMAN
BY D. Clyde Jones

Aug. 19, 1941.  O. M. HOCH ET AL  2,253,275
LAMINATED TUBE WINDING MACHINE
Filed July 31, 1940  5 Sheets-Sheet 5

INVENTOR.
OTTO M. HOCH
CARL J. STUDEMAN
BY D. Clyde Jones
ATTORNEY.

Patented Aug. 19, 1941

2,253,275

UNITED STATES PATENT OFFICE 2,253,275

LAMINATED TUBE WINDING MACHINE

Otto M. Hoch, Rochester, and Carl J. Studeman, Webster, N. Y., assignors to M. D. Knowlton Co., Rochester, N. Y., a corporation of New York Application July 31, 1940, Serial No. 348,856

14 Claims. (Cl. 93—81)

This invention relates to a machine for winding convolute tubes of paper, fiber and the like and particularly to a machine of this character having an attachment for winding a strip of metal, plastic material or the like in the laminations or convolutions of the tube at one or both ends thereof.

The present invention has for its purpose to provide an improved machine which is capable of automatically producing laminated container bodies like those illustrated in the Williams Patent No. 2,141,499 granted December 27, 1938.

It is an object of this invention to provide an attachment for laminated tube winding machines which attachment automatically feeds a narrow strip of metal or the like of predetermined length to a position to be wound between the laminations or convolutions of a tube of paper or the like.

It is a further object of the invention to provide an attachment of the character mentioned which automatically perforates a strip of material, cuts the strip into sections of predetermined lengths and feeds these sections between the laminations of a tube being wound.

It is another object of the invention to provide an attachment of the character mentioned which is adjustable to vary the length of the sections of strip material so that they will be substantially equal to the circumference of the tube in which they are to be wound.

These and other objects of the invention will appear from the detailed description and claims when taken with the drawings in which:

Fig. 2 is a plan view of the machine illustrated in Fig. 1;

Figures 1, 1A:
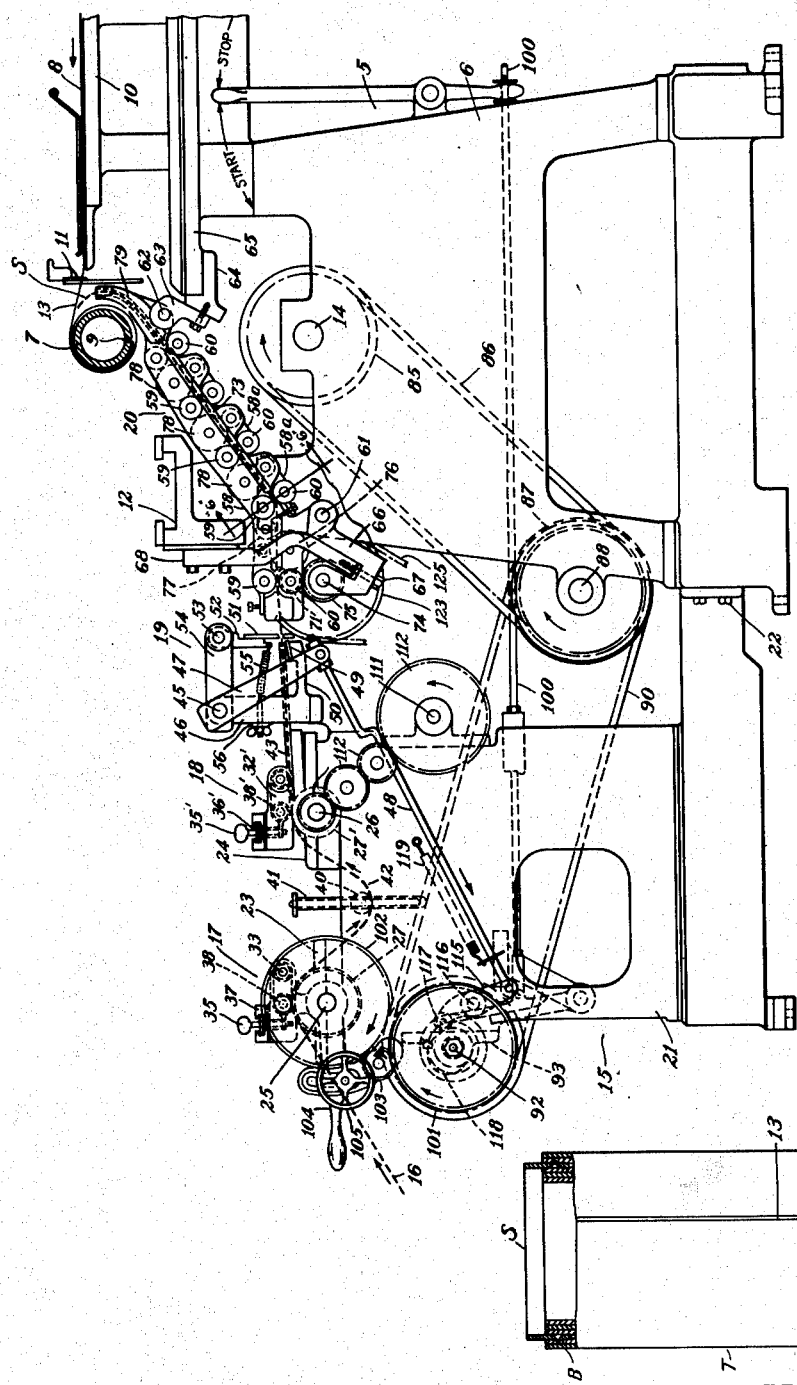
Fig. 1 is a side elevation of a machine made in accordance with the present invention, a laminated tube winding machine of well known construction being shown only fragmentarily.
Fig. 1a is a side view partly in section of a laminated tube made on the machine of the present invention.

For the purpose of furnishing a clear understanding of the present invention, there has been illustrated in the drawings, a laminated tube winding machine generally indicated 5. This machine which forms a part of the present invention has been shown only fragmentarily, since its structure is well known. The machine 5 (Fig. 1) comprises a frame 6 on which a mandrel 7 is rotatably mounted. This mandrel is rotated by suitable means (not shown) to wind a strip or sheet of paper, fiber or the like, indicated by the reference character 8, thereabout to provide a tubular body of the desired number of laminations or convolutions. The sheet 8 is fed from a roll (not shown) to a position adjacent the mandrel where it is gripped in a slit-like opening 9 in the mandrel, suitable means being provided in the mandrel for gripping the free end of the strip while the mandrel is being rotated. The strip 8 is fed to the slit-like opening in the mandrel by means including a feed table mechanism 10.

When the desired number of laminations of the sheet 8 have been wound upon the mandrel 7, the mandrel is stopped and the cutoff knife 11 severs the sheet. An ejector (not shown) but which is slidably mounted in the guide 12 carried by the frame 6, slides the completed laminated tube along the mandrel to a position where the end 13 of the severed strip is pressed down on to the tube body. When a tube has been wound on the mandrel and moved out of the way by means of the mentioned ejector, the feed table mechanism 10 moves toward the mandrel to feed the cut end of the strip into the slit-like opening 9 which at this time will be alined with the strip extending from the feed table. With the cut end of the strip gripped in the slit-like opening, the mandrel will again rotate to form a new laminated tube thereon.

The feed table mechanism 10, cutoff knife 11, mandrel 7 and ejector (not shown) are all operated in timed relation to effect the operations just described. The means for operating these parts have not been illustrated since they are old and well known. However, it should be mentioned that a continuously rotating shaft 14 (Fig. 1) carried by the machine frame 6 below the mandrel is provided with suitable cams for operating the ejector, cutoff knife and feed table in timed sequence. The mandrel is intermittently driven thru a suitable gear train (not shown)

from the same motor (not shown) which rotates the mentioned cam shaft 14.

Usually two or more laminated tubes are wound simultaneously on these machines and this is accomplished by slitting the sheet 8 longitudinally before it reaches the mandrel by any suitable arrangement of knives or the like (not shown). It will be understood that the sheet 8 has its upper surface coated with a suitable adhesive so that as the laminations are wound about the mandrel, they will be united to form a unitary body.

The laminated tube winding machine selected for the purpose of illustrating the present invention is adapted to simultaneously wind two laminated tubes of paper or the like. The sheet 8 is slit longitudinally before it reaches the feed table 10, so that the resulting strips 8a and 8b (Fig. 2) may be spread apart slightly to provide a space between the tubes into which the projecting edges of the metal or plastic strips at the adjacent ends of the tubes may extend.

The attachment, generally indicated 15, disposed at the left of the machine 5 (Fig. 1) continuously withdraws a strip or strips of metal, plastic material or the like from a supply reel or reels, perforates these strips, cuts them into sections S (Fig. 1a) of predetermined length and feeds the leading end of these sections to a position adjacent the mandrel 7 in timed relation with the tube winding operation so that a section S of the strip material will be enclosed within the laminations of the tube or tubes being wound. These sections of strip material are fed to the mandrel in such a manner that an edge thereof will project beyond the end of the laminated tube to provide a completed tube T like that shown in Fig. 1a.

The attachment 15 illustrated in the drawings is designed to feed four narrow strips 16 of metal, plastic material or the like, simultaneously to a position adjacent the mandrel so that a strip section S, will be secured between the laminations at each end of the two tubes being wound on the mandrel. It is to be understood that the number of strips as well as the number of tubes wound simultaneously may be varied. The strips 16 are fed from supply reels (not shown) but which will be suitably supported to the left of the attachment 15 as viewed in Fig. 1.

Each of the strips are drawn from their respective supply reels by continuously rotating measuring and perforating units 17. They then pass through feed units 18 which operate intermittently in timed relation to the mandrel and its related parts, and thence thru strip severing units 19 to strip section feeding units 20. Since the units just enumerated are identical for each of the strips fed through the attachment 15 only one series of these units will be described in detail.

Figure 3:
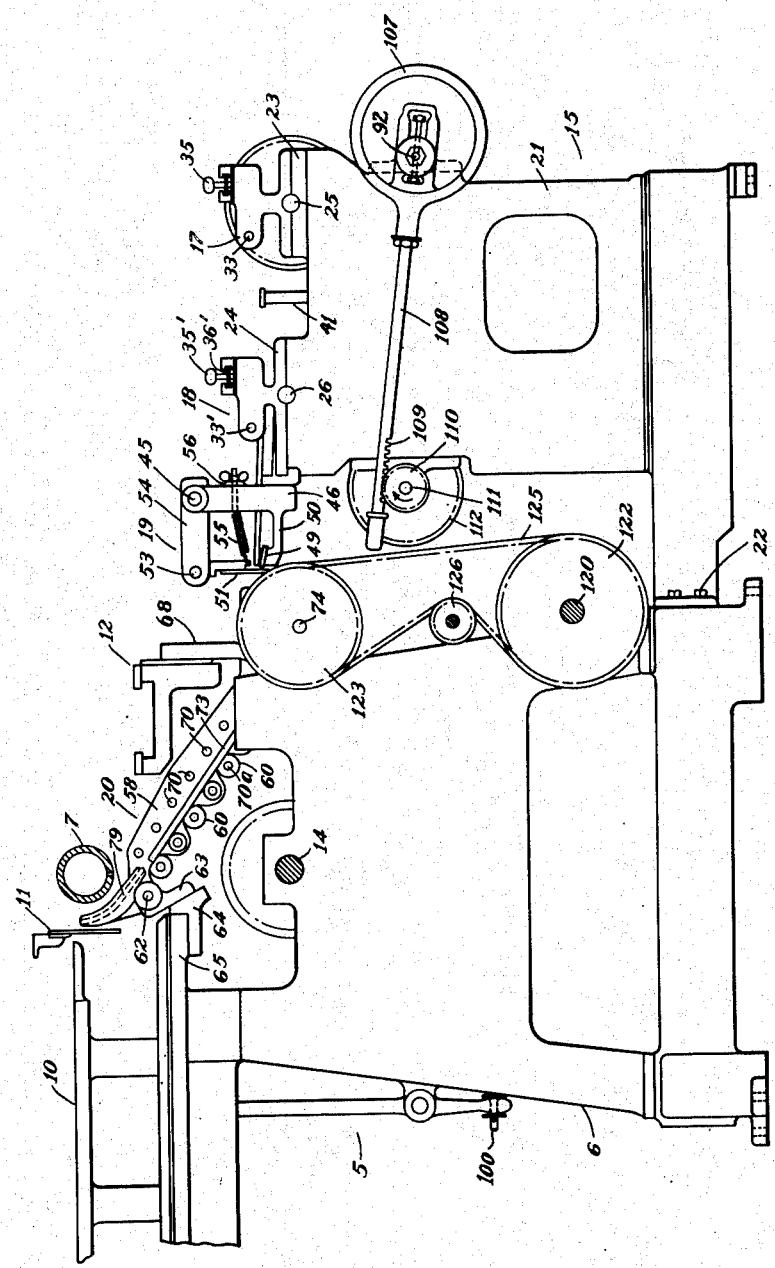
Fig. 3 is a side elevation of a portion of the machine illustrated in Fig. 1, looking from the rear of that figure.
Figure 4:
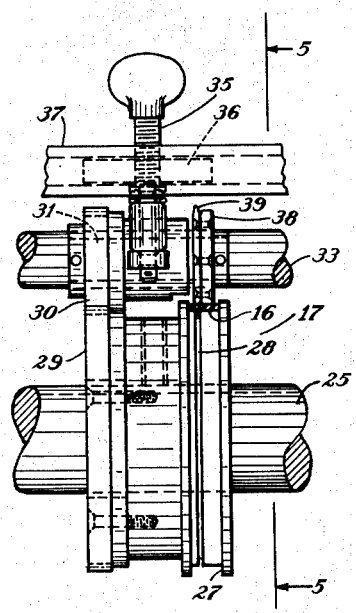
Fig. 4 is a detail view of one of the measuring units forming a part of the present invention.
Figure 5:
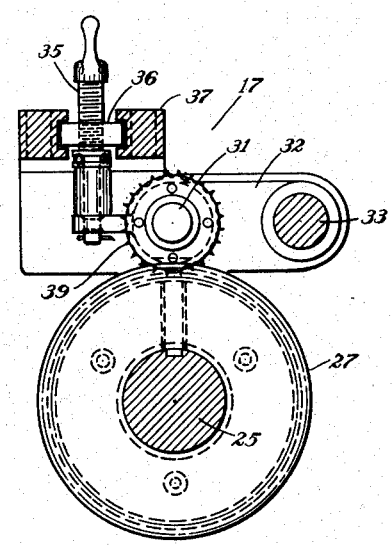
Fig. 5 is a view taken substantially on the line 5—5 of Fig. 4.

Referring to Figs. 1, 2 and 3, it will be noted that the attachment 15 comprises side frames 21 which may be bolted or otherwise secured at 22 (Fig. 1) to the frame 6 of the laminated tube winder 5. These side frames are each provided at their upper ends with bearing brackets 23 and 24 in which the shafts 25 and 26 are journaled. The shaft 25 is driven continuously as will appear later and is provided with a series of rollers 27 (Fig. 4) which form a part of the measuring units 17 and which are keyed to the shaft to turn therewith. These rollers are adjustable along the shaft so that the spacing between them may be adjusted in accordance with the length of the tubes being wound on the mandrel. By reference to Figs. 4 and 5 it will be noted that these rollers are flanged to provide a channel within which the strip 16 is received. A narrow groove 28 is formed in the periphery of the rollers for a purpose which will appear later. A gear 29 fixed to each of the rollers 27 meshes with a small gear 30 fixed to a short shaft 31 whereby these short shafts rotate with the shaft 25.

These short shafts 31 are each journaled in one end of the adjustable arms 32 which are carried by the transverse shaft 33 supported at its ends in the bearing brackets 23. By reference to Figs. 1, 4 and 5 it will be noted that each of the arms 32 may be adjusted about the shaft 33 to vary the distance between the shaft 25 and the short shafts 31 by means of the headed bolt 35. Each of these bolts, which are swiveled in the free end of the arms 32, are threaded through a slide member 36. Each of these members 36 are slidable along the grooved guides 37 which extend between the brackets 23.

A combined pressure roller 38 and perforating wheel 39 fixed to each of the short shafts 31 cooperates with its respective roller 27 to withdraw a strip 16 from a supply reel. The perforating wheels 39 are provided with a plurality of toothlike projections which enter the grooves 28 of the lower feed rollers 27 to perforate the strips as they pass between the rollers 27 and 38. When the strips are subsequently wound in the laminations of the paper tubes, the burrs B (Fig. 1a) which are formed on the strips about the perforations are imbedded in the paper and aid in anchoring the strips to the tubes. The perforating wheels 39 may be omitted if desired or alternately may be designed to punch holes in the strips 16 in a manner to avoid the formation of burrs B.

From the construction described, it will be understood that each of the measuring units 17 are adjustable along their supporting shafts 25 and 33 to vary the spacing therebetween. As will appear later, the shaft 25 rotates continuously so that the strips 16 are withdrawn at a uniform rate from their supply reels.

The continuously moving strips 16 are fed by the measuring units 17 under the roll 40 (Fig. 1) which extends transversely of the machine frame and which is free to rotate in the vertical guides 41 provided on each of the side frames 21. This roll rests on the strips to start the continually forming loops 42 (Fig. 1) downward between the units 17 and 18.

After passing under the roller 40, the strips are threaded thru the intermittently operated feed units 18 which may be identical in construction and adjusted in the same manner as the continuously operating measuring units 17 except that the perforating wheels 39 are omitted. The pressure between the feed rollers 27' and 38', which correspond respectively to the rollers 27 and pressure rollers 38 of the unit 17, is adjusted by means of the bolts 35' as in the case of the unit 17. However, compression springs surrounding the bolts 35' and disposed between the free ends of the arms 32' and the slide members 36' resiliently maintain the upper pressure rolls 38' in contact with the upper surface of the strips 16. Each of the feed units 18, as has been mentioned, are driven intermittently so that when at rest, the continuously operating measuring units 17 will cause the strips 16 to form a loop as indicated at 42 in Fig. 1, but when the feed unit 18 is operating it will pull the strip taut between the units 17 and 18. Each of the units 18 are adjusted to feed slightly more of the strips 16 than the units 17 deliver per cycle, and the gripping effort of units 18 being resilient and less than that of units 17 will cause the rolls of unit 18 to slip slightly in the strips when they become taut between the units 17 and 18. Thus the unit 17 serves to measure the length of the strip that can pass thru the unit 18 during its period of operation. It will be appreciated that by varying the speed of rotation of the feed roller 27 the length of the strip that will pass through the unit 18 for any given cycle may be changed.

A guide 43 adjacent each of the feed units 18 directs the strips from the feed units 18 to the cutoff units 19. These cutoff units operate in timed relation with the feed units 18 to sever the strips when they have been pulled taut between the measuring units 17 and the feed units 18. The cutoff units 19 like the units 17 and 18 are adjustable relative to each other to vary the spacing therebetween in accordance with the length of paper tubes being wound on the mandrel. Each of the cutoff units are simultaneously operated by the transverse rock shaft 45 which is supported at its ends in the vertical bracket 46 carried by each side frame 21. One end of this rock shaft has a crank arm 47 (Fig. 1) fixed thereto which is oscillated by means of the rod 48 in a manner to be hereinafter described.

A long stationary knife 49 which is supported on the horizontally projecting portion 50 of the brackets 46 cooperates with the reciprocating blades 51 of the cutoff units to sever the strips 16 into sections S of predetermined length. Each reciprocating knife 51 is fixed to an arm 52 which is free to turn on the rod 53. This rod 53 is supported at its ends in the connecting arms 54 fixed to the rock shaft 45, so that it will oscillate with the rock shaft to raise and lower the reciprocating knives 51 relative to the stationary knife 49. Each of the knife supporting arms 52 are adjustable along the transverse rod 53 to aline the knives 51 with their respective strips 16. Collars 52a (Fig. 2) secure these arms in adjusted position. By reference to Fig. 1 it will be noted that each of the arms 52 has one end of a spring 55 secured thereto, the other end of these springs being adjustably connected to a plate 56 extending between the vertical brackets 46 to resiliently maintain the reciprocating knives 51 against the stationary knife 49.

Figure 6:
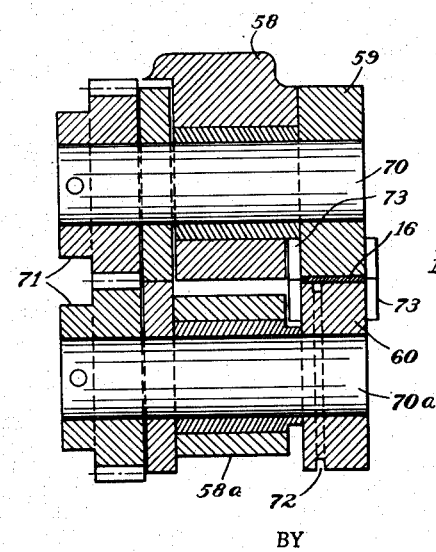
Fig. 6 is a sectional view through one of the feed units, taken substantially on the line 6—6 of Fig. 1.

When the strips have been pulled taut between the units 17 and 18, the shaft 45 is rocked so that the knives 51 sever the strips 16, the projecting ends of the strips in the meantime having been extended into the feed unit 20. The feed units 20 each comprise a series of rolls which are driven continuously and feed the cut sections S (Fig. 1a) of the strips to a position where they will be wound in the laminated tubes being formed on the mandrel. These units 20 each comprise a member 58 on which pairs of driven rolls 59 and 60 are rotatably mounted (Fig. 6). These members are adjustably supported on the frame 6 of the tube winding machine 5, by means of the transverse rods 61 and 62 on which they are slidably mounted so that they may be alined with the respective strips 16.

The upper rod 62 is supported at its ends in the spaced brackets 63, which are adjustably bolted to inclined supports 64 carried by the laminator bed 65 of the frame 6 (Fig. 1). The lower rod 61 is supported at its ends in spaced U-shaped members 66 which are adjustably secured by means of the screws 67 to the spaced depending brackets or supports 68. These brackets 68 are fixed to the side of the laminator bed 65 which carries the guide 12.

By loosening the bolts which secure the brackets 63 and members 66 to their respective supports 64 and 68, the screws 67 which extend through each of the U-shaped members 66 and are threaded into the lower end of the depending brackets 68, may be turned in one direction or the other. These screws shift the U-shaped members relative to the depending brackets and thereby raise or lower the rod 61 in an inclined plane parallel to the plane of the lower angular portion of the depending brackets 68. Since the lower end of each of the feed roll supporting members 58 is carried on this rod these members will also be raised or lowered when the screws 67 are turned. The adjusted position of the feed units 20 is maintained by tightening the bolts which secure the rod supporting brackets 63 and members 66 to their respective supports 64 and 68. Thus all of the feed units 20 may be adjusted simultaneously toward or away from the mandrel 7 to bring the free ends of the strip sections S into the proper position for entering between the laminations of the particular size tube being wound.

Fig. 6 represents a typical section through one of the feed units 20 where it will be noted that the upper and lower shafts 70 and 70a are respectively journaled in the member 58 and adjustable member 58a carried thereby. These shafts each have a gear 71 fixed to one end thereof which are in mesh so that the upper shaft 70 will rotate the lower shaft 70a. The feed rolls 59 and 60 fixed on the ends of these shafts opposite the gears 71 are of a width to guide and feed the strip section along the unit 20. The lower roll 60 of each pair of feed rolls is provided with a channel 72 to provide clearance for the burrs surrounding the perforations in the strip section. Guide plates 73 supported at each side of the feed rolls maintain the strip sections between the rolls so that they cannot shift laterally.

The feed rolls 59 and 60 are driven continuously from the shaft 74. This shaft which is journaled in the U-shaped member 66 (Fig. 1) is driven continuously in a manner to be described and is provided with a gear 75 (Fig. 1) which engages the lower gear 71 of the first pair of feed rolls to drive the same. The rotation of this lower gear is in turn transmitted to the intermediate gears 76 and 77 (Fig. 1) to in turn drive the upper gear of the second pair of feed rolls. Each of the remaining pairs of feed rolls are driven by large intermediate gears 78 journaled in the support 58 and which are in mesh with the upper gears of adjacent pairs of feed rolls.

A pair of spaced curved bars 79 supported on the upper end of each of the feed roll supporting members 58 guide the strip sections S into the proper position as shown in Fig. 1 where the strip section can enter between the laminations of the tube body being wound.

Figure 7:
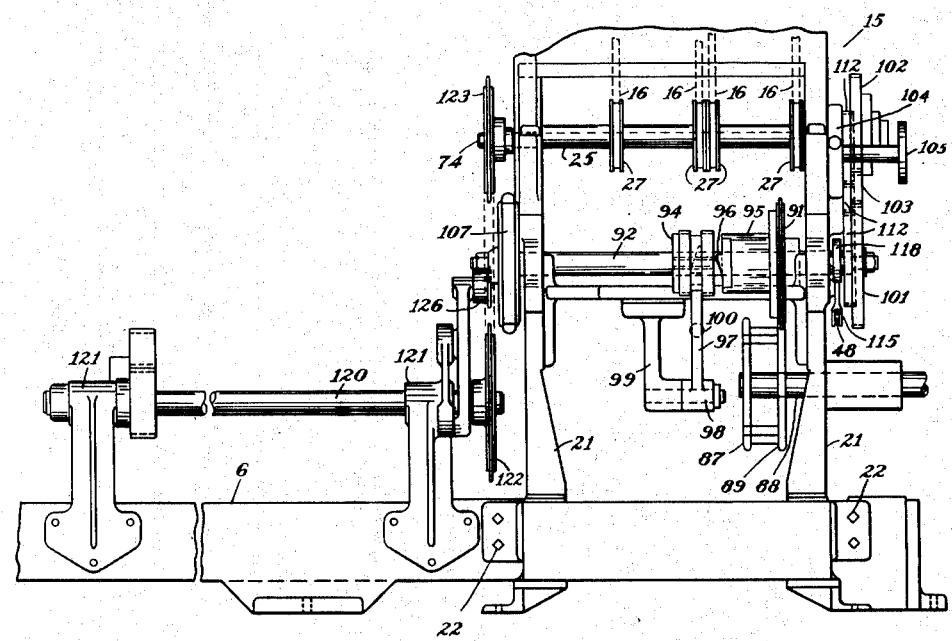
Fig. 7 is a view looking from the left of Fig. 1 with certain parts broken away for the sake of clarity.

Referring particularly to Figs. 1 and 7, it will be noted that the continuously rotating cam shaft 14 has a sprocket 85 fixed thereto which is connected by the chain 86 to the sprocket 87 to rotate the same. This sprocket 87 is keyed to a horizontal shaft 88 journaled in the frame 6 (Fig. 1). This shaft is provided with a second sprocket 89 (Fig. 7) connected by the chain 90 to the sprocket 91 which turns freely on the shaft 92. The shaft 92 is journaled in the spaced bearing brackets 93 fixed to the side frames 21 of the attachment 15. A clutch 94 keyed to the shaft 92 (Fig. 7) adjacent the hub 95 of the sprocket 91 is manually operated to lock this sprocket to the shaft 92. When the clutch is closed the shaft 92 will be driven by the sprocket 91 at the same speed as the cam shaft 14, since the sprockets 91, 89, 87 and 85 are of the same diameter. Thus the parts driven by the shaft 92 will be operated in timed relation to the parts controlled by the cam shaft.

The clutch 94 (Fig. 7) may be of conventional construction and preferably of the type including a horizontally movable key carried by the clutch body and which is resiliently held in locking engagement with the projection 96 on the hub 95 of the sprocket 91. This key is shifted out of engagement with the projection 96 to allow the sprocket 91 to turn freely on the shaft 92 by means of the lever 97 (Fig. 7) pivoted at 98 to the depending bracket 99. A suitable shift rod mechanism 100 connected to the lever 97 provides a convenient means for manually rocking the lever 97 into operative or inoperative position to open or close the clutch so that the sprocket 91 may run free on the shaft 92 or rotate the same.

A gear 101 (Figs. 1 and 7) fixed to one end of the shaft 92 drives the slip gear 102 mounted on a hub which is fixed to one end of the measuring unit shaft 25 by means of an intermediate gear 103. This intermediate gear 103 is carried by the adjustable quadrant 104 so that the gear 101 may be replaced by a larger or smaller gear to vary the speed of rotation of the shaft 25. The gear 103 is raised or lowered about the shaft 25 as a center to mesh with a larger or smaller gear 101 and may be locked in adjusted position by the hand wheel 105. Thus by changing the size of gear 101 the length of strip material 16 measured by the units 17 during each cycle of operation may be accurately controlled so that the strip sections S will be substantially equal to the circumference of the tube being wound on the mandrel. Since the shaft 92 rotates constantly when the clutch 94 is closed, the shaft 25 will also rotate constantly so that strips 16 will be withdrawn continuously from their respective supply reels.

Referring to Figs. 3 and 7 it will be noted that the shaft 92 is provided with an adjustable eccentric and strap generally designated 107 at the end opposite that which carries the gear 101. This eccentric reciprocates the rod 108. It will be understood that this eccentric is preferably of the type which permits the throw of the eccentric and consequently the reciprocation of the rod 108 to be adjusted. The free end of the rod 108 has rack teeth 109 formed thereon which engage the pinion 110 carried by the shaft 111. This pinion 110 is mounted on the shaft 111 in such a manner that when the rod 108 is reciprocated to the right as viewed in Fig. 3, to turn the pinion, the pinion acting through a roller clutch (not shown) will rotate the shaft 111 in the direction indicated by the arrow, but during the retrograde movement of the rod, that is, to the left as viewed in Fig. 3, the pinion will turn free on the shaft. During this retrograde movement the shaft 111 is held from turning backward by means of a roller clutch similar to the one causing the forward rotation. Thus for one-half revolution of the eccentric 107 the shaft 111 will be rotated in a clockwise direction as viewed in Fig. 3 but will remain stationary during the other half of the revolution of the eccentric providing intermittent rotation of the shaft 111 in one direction only. This intermittent rotation of the shaft 111 is transmitted to the feed unit shaft 26 by means of the train of gears 112. It will be understood that by adjusting the throw of the eccentric the number of revolutions which the shaft 26 makes during each revolution of the shaft 92 may be accurately controlled to insure that all of the slack in the strips 16 between the units 17 and 18 will be taken up when the feed unit 18 is operated in the manner just described.

The continuously driven shaft 92 also operates the reciprocating knives 51. These knives are reciprocated by the rod 48 connected at one end to the crank arm 47 fixed to the rock shaft 45 (Fig. 1). The other end of this rod 48 is connected to one end of a lever 115 (Figs. 1 and 7) pivoted at 116 to the side frame 21 of the attachment 15. A cam roller 117 carried on the other end of this lever rolls on the surface of a cam 118 fixed on the continuously driven shaft 92. A spring 119 fixed at one end to the side frame 21 and at its other end to the rod 48 normally maintains the knives 51 in raised position. However, when the cam roller 117 engages the high dwell of cam 118 the rod 48 is moved in the direction indicated by the arrow in Fig. 1 to lower the knives 51 to sever the strips 16.

The plurality of rolls 59 and 60 of the feed units 20 are driven from the shaft 120 (Figs. 2, 3 and 7). This shaft is continuously driven from the main clutch shaft (not shown) of the machine 5, and is journaled in bearing supports 121 fixed to the main frame 6 of the laminated tube winder 5. A sprocket 122 fixed to the end of the shaft 120 adjacent the attachment 15 is connected to the sprocket 123 fixed to the shaft 74 by means of the chain 125. An idler sprocket 126 adjustably mounted on the frame 6 serves to maintain the chain 125 under proper tension. The shaft 74 which is journaled in the U-shaped members 66 and which is constantly rotated in the manner just described carries the gear 75 which drives the feed rolls 59 and 60.

We claim:

1. A machine of the character described comprising a mandrel, means for winding sheet material on said mandrel to form convolute tubes, means for continuously feeding a strip of material, means for cutting said strip into predetermined lengths, and means for interleaving said lengths in the convolutions of said sheet of material.

2. A machine of the character described comprising a mandrel, means for winding sheet material on said mandrel to form convolute tubes, means for continuously feeding a strip of material, means for cutting said strip into predetermined lengths, and means for interleaving said lengths in the convolutions of said sheet of material with a portion of the strip projecting beyond an edge of said sheet.

3. A machine of the character described comprising a mandrel, means for winding sheet material on said mandrel to form convolute tubes, means for intermittently feeding a strip of material, means for cutting said strip into sections of predetermined length, and means for interleaving said sections in the convolutions of said tubes with a portion of said sections projecting beyond an end of said tubes.

4. A machine of the character described comprising a support, means on said support for continuously withdrawing a strip of material from a source of supply and for feeding said strip along said support, means on said support for intermittently stopping the movement of said strip along said support, and an intermittently operated knife for severing said strip when stopped by said second mentioned means.

5. A machine of the character described comprising a support, means on said support for continuously withdrawing a strip of material from a source of supply and for feeding said strip along said support, means for perforating said strip, means on said support for intermittently stopping the movement of said strip along said support and an intermittently operated knife on said support for severing said strip when stopped by said third mentioned means.

6. A machine of the character described comprising a support, a mandrel on said support, means for winding sheet material on said mandrel to form convolute tubes, means on said support for continuously withdrawing a strip of material from a source of supply, intermittently operating means on said support to engage and feed said strip as it leaves said second mentioned means, means for severing said strip into sections of predetermined lengths as it is fed by said intermittently operating means, and means for feeding said sections to a position adjacent said mandrel whereby a section of said strip may be wound in the convolutions of the tubes formed on said mandrel.

7. In combination with a convolute tube winding machine having a tube-forming mandrel, a mechanism for feeding sections of strip material to be wound into the convolutions of tubes made on said mandrel, said mechanism comprising means for continuously withdrawing strip material from a source of supply, strip engaging means adjacent said means for intermittently feeding a portion of said strip of predetermined length, means operable in timed relation to said strip engaging means for severing said strip into sections equal to the length of the portion moved by said strip engaging means, and means for feeding said sections to a position adjacent said mandrel for winding into the convolutions of tubes made on said mandrel.

8. An attachment for use with a convolute tube winding machine comprising a frame, means on said frame for continuously feeding a strip of material, intermittently operating means on said frame adapted to receive said strip as it is fed by said first-mentioned means, strip severing means carried on said frame and operable in timed relation to said intermittently operating means to sever said strip into sections of predetermined length.

9. An attachment of the character described, comprising a frame, a strip measuring unit mounted on said frame, a strip feeding unit mounted on said frame for receiving a strip from said measuring unit, a strip cutting unit for severing said strip into sections of predetermined length, means for operating said measuring unit to continuously withdraw a strip of material from a source of supply, means for operating said feeding unit to intermittently feed sections of said strip of predetermined length to said strip cutting unit and means for operating said cutting unit to sever the strip as said sections are fed thereto.

10. An attachment of the character described comprising a frame, a strip measuring and perforating unit mounted on said frame, a strip feeding unit mounted on said frame for receiving a strip from said measuring unit, a strip cutting unit for severing said strip into sections of predetermined length, means for operating said measuring unit to continuously perforate and withdraw a strip of material from a source of supply, means for operating said feeding unit to intermittently feed a section of said strip of predetermined length to said strip cutting unit and means for operating said cutting unit to sever the strip when said section has been fed thereto.

11. The method of making a convolute tube having a strip of material wound in the convolutions thereof, which method comprises winding a sheet of material about a mandrel, intermittently feeding a strip of material in a direction toward said mandrel, severing said strip into sections in timed relation to the intermittent feeding thereof, and feeding one of said sections between the convolutions of the sheet of material being wound on said mandrel.

12. The method of making a convolute tube having a strip of material wound in the convolutions thereof, which method comprises feeding a sheet of material in a given direction toward a mandrel, winding said sheet material on said mandrel, feeding a strip of material, severing said strip to provide a section of predetermined length while holding a portion of said strip stationary, feeding said section of the strip to said mandrel in generally the same direction as said sheet material, and interleaving said section in the convolutions of said sheet on said mandrel with a portion of said section projecting beyond an edge of said sheet.

13. The method of making a convolute tubular member, which method comprises winding a sheet of material around a mandrel, continuously withdrawing a strip of material from a source of supply, intermittently holding a portion of said strip stationary, severing said strip to provide a section of predetermined length while said portion of said strip is held stationary, feeding said section of the strip to said mandrel, and interleaving said section in the convolutions of said sheet on said mandrel.

14. The method of making a convolute tubular member, which method comprises winding a sheet of material around a mandrel, continuously withdrawing a strip of material from a source of supply, intermittently holding a portion of said strip stationary, severing said strip to provide a section of predetermined length while said portion of said strip is held stationary, feeding said section of the strip to said mandrel, and interleaving said section in the convolutions of said sheet on said mandrel with a portion of said section projecting beyond an edge of said sheet.

OTTO M. HOCH.
CARL J. STUDEMAN.